(12) United States Patent
Anwar

(10) Patent No.: US 8,056,006 B2
(45) Date of Patent: Nov. 8, 2011

(54) SYSTEMS AND METHODS FOR DIGITAL DOCUMENT PROCESSING

(75) Inventor: Majid Anwar, Glasgow (GB)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 753 days.

(21) Appl. No.: 10/853,495

(22) Filed: May 24, 2004

(65) Prior Publication Data

US 2004/0236790 A1 Nov. 25, 2004

Related U.S. Application Data

(63) Continuation of application No. 09/703,502, filed on Oct. 31, 2000, now Pat. No. 7,055,095.

(30) Foreign Application Priority Data

Apr. 14, 2000 (GB) .................................... 0009129.8

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. ..................... 715/249; 715/243; 707/821
(58) Field of Classification Search ............... 707/104.1, 707/821; 715/243, 249
See application file for complete search history.

(56) References Cited

U.S. PATENT DOCUMENTS

| | | | |
|---|---|---|---|
| 4,751,740 | A | 6/1988 | Wright |
| 4,839,634 | A | 6/1989 | More et al. |
| 5,083,262 | A | 1/1992 | Haff |

(Continued)

FOREIGN PATENT DOCUMENTS

EP  0 438 194 A  7/1991

(Continued)

OTHER PUBLICATIONS

Blumberg, et al. Visual Realism and Interactivity for the Internet. Proceedings of IEEE Compcon, 1997, San Jose, Feb. 23-26, 1997, Los Alamitos, IEEE Comp. Soc. Press. 269-73 (1997).

(Continued)

*Primary Examiner* — Apu Mofiz
*Assistant Examiner* — Jared Bibbee
(74) *Attorney, Agent, or Firm* — Cha & Reiter, LLC

(57) ABSTRACT

Systems that employs an adaptable front end for determining a file-type to associate with the output from a source application and for processing the output, as a function of the file type, to generate a display list that is representative of objects and shapes that represent components within the visual presentation of the data. The display list is then processed by a rendering engine, which may be located on an embedded device. The rendering engine processes the components contained within the display list to render an image of the source application's output that may be presented on the display of the device. As will be described below, the adaptable front end determines the file structure of the source being processed, thereby providing a device that may operate with a plurality of different file types, and source applications.

6 Claims, 3 Drawing Sheets

U.S. PATENT DOCUMENTS

| | | | |
|---|---|---|---|
| 5,119,465 A | | 6/1992 | Jack et al. |
| 5,278,678 A | * | 1/1994 | Harrington .................. 358/518 |
| 5,369,735 A | | 11/1994 | Thier et al. |
| 5,390,320 A | | 2/1995 | Smithline |
| 5,463,725 A | | 10/1995 | Henckel et al. |
| 5,504,891 A | | 4/1996 | Motoyama et al. |
| 5,530,865 A | | 6/1996 | Owens et al. |
| 5,534,975 A | * | 7/1996 | Stefik et al. ........................ 399/1 |
| 5,579,519 A | * | 11/1996 | Pelletier ........................ 717/139 |
| 5,608,874 A | | 3/1997 | Ogawa et al. |
| 5,708,828 A | | 1/1998 | Coleman |
| 5,754,348 A | | 5/1998 | Soohoo |
| 5,806,068 A | * | 9/1998 | Shaw et al. ............... 707/103 R |
| 5,867,166 A | | 2/1999 | Schick et al. |
| 5,899,988 A | * | 5/1999 | Depledge et al. .................. 707/3 |
| 5,907,835 A | * | 5/1999 | Yokomizo et al. ................ 707/1 |
| 5,909,207 A | | 6/1999 | Ho |
| 5,910,805 A | | 6/1999 | Haschart et al. |
| 5,911,066 A | | 6/1999 | Atkinson et al. |
| 6,034,700 A | * | 3/2000 | Rumph et al. ................. 345/441 |
| 6,038,561 A | | 3/2000 | Snyder et al. ...................... 707/6 |
| 6,097,371 A | * | 8/2000 | Siddiqui et al. ................ 345/164 |
| 6,125,391 A | * | 9/2000 | Meltzer et al. ................. 709/223 |
| 6,335,722 B1 | | 1/2002 | Tani et al. |
| 6,336,124 B1 | * | 1/2002 | Alam et al. ................... 715/523 |
| 6,400,467 B1 | * | 6/2002 | Harrington .................... 358/1.9 |
| 6,525,749 B1 | | 2/2003 | Moran et al. |
| 6,643,652 B2 | | 11/2003 | Helgeson et al. |
| 6,717,573 B1 | | 4/2004 | Shahoian et al. |
| 2001/0011288 A1 | * | 8/2001 | Mastie ........................... 707/525 |
| 2006/0242575 A1 | * | 10/2006 | Winser ........................... 715/530 |

FOREIGN PATENT DOCUMENTS

| | | |
|---|---|---|
| EP | 0 465 250 | 1/1992 |
| EP | 0 479 496 A | 4/1992 |
| EP | 0 513 584 A | 11/1992 |
| EP | 529 121 A | 3/1993 |
| EP | 0 753 832 A | 1/1997 |
| EP | 0 764 918 A | 3/1997 |
| EP | 0 860 769 A | 8/1998 |
| EP | 0 949 571 A2 | 10/1999 |
| GB | 2 313 277 A | 11/1997 |
| JP | 2000-076226 | 3/2000 |
| JP | 2000-099543 | 4/2000 |
| WO | WO 98/10356 | 3/1998 |
| WO | WO 98 37506 | 8/1998 |
| WO | WO 97/34240 | 9/1998 |
| WO | WO 99/10840 | 3/1999 |
| WO | WO 00/10372 | 3/2000 |

OTHER PUBLICATIONS

Rowe, J.H. Metafiles and Computer Graphics. Computers and Graphics Pergamon Press, Ltd. Oxford, Great Britain. 10:2 (103-6)(1986).

Phelps et al. Toward Active, Extensible, Networked Documents: Multivalent Architecture and Applications. Proceedings of ACM Digital Libraries (1996).

Phelps et al. Multivalent Documents: A New Model for Digital Documents. Technical Report, CSD-98-999 (1998).

Phelps et al. Multivalent Documents: Inducing Structure and Behaviors in Online Digital Documents. Proceedings of Hawaii International Conference on System Sciences (1996) (Best Paper Award, Digital Documents Track).

Phelps et al. Multivalent Annotations. Proceedings of the First European Conference on Research and Advanced Technology for Digital Libraries. (1997).

Final Office Action dated Feb. 27, 2008 for U.S. Appl. No. 10/813,285.

Satohira, Toshihiko, et al.; "Office Documents Administrating System with Japanese PDF Files;" Matsushita Technical Journal, vol. 44, No. 5; Oct. 1998.

* cited by examiner

SYSTEMS AND METHODS FOR DIGITAL DOCUMENT PROCESSING

RELATED APPLICATIONS

This application is a continuation of U.S. patent Ser. No. 09/703,502, filed Oct. 31, 2000, which claims priority to the earlier filed British Patent Application No. 0009129.8, filed 14 Apr. 2000, and having Majid Anwar as an inventor, the contents of which are hereby incorporated by reference.

FIELD OF THE INVENTION

The invention relates to data processing systems. More particularly, the invention relates to methods and systems for processing "digital documents" (as defined herein) and to devices incorporating such methods and systems. In general terms, the invention is concerned with generating an output representation of a source document; e.g., as a visual display or as hardcopy.

BACKGROUND

As used herein, the term "digital document" is used to describe a digital representation of any type of data processed by a data processing system which is intended, ultimately, to be output in some form, in whole or in part, to a human user, typically by being displayed or reproduced visually (e.g., by means of a visual display unit or printer), or by text-to-speech conversion, etc. A digital document may include any features capable of representation, including but not limited to the following: text; graphical images; animated graphical images; full motion video images; interactive icons, buttons, menus or hyperlinks. A digital document may also include non-visual elements such as audio (sound) elements.

Data processing systems, such as personal computer systems, are typically required to process "digital documents," which may originate from any one of a number of local or remote sources and which may exist in any one of a wide variety of data formats ("file formats"). In order to generate an output version of the document, whether as a visual display or printed copy, for example, it is necessary for the computer system to interpret the original data file and to generate an output compatible with the relevant output device (e.g., monitor, or other visual display device or printer). In general, this process will involve an application program adapted to interpret the data file, the operating system of the computer, a software "driver" specific to the desired output device and, in some cases (particularly for monitors or other visual display units), additional hardware in the form of an expansion card.

This conventional approach to the processing of digital documents in order to generate an output is inefficient in terms of hardware resources, software overheads and processing time, and is completely unsuitable for low power, portable data processing systems, including wireless telecommunication systems, or for low cost data processing systems such as network terminals, etc. Other problems are encountered in conventional digital document processing systems, including the need to configure multiple system components (including both hardware and software components) to interact in the desired manner, and inconsistencies in the processing of identical source material by different systems (e.g., differences in formatting, color reproduction, etc.). In addition, the conventional approach to digital document processing is unable to exploit the commonality and/or re-usability of file format components.

SUMMARY OF THE INVENTION

It is an object of the present invention to provide digital document processing methods and systems, and devices incorporating such methods and systems, which obviate or mitigate the aforesaid disadvantages of conventional methods and systems.

More particularly, the systems and methods described herein include systems that employs an adaptable front end for determining a file-type to associate with the output from a source application and for processing the output, as a function of the file type, to generate a display list that is representative of objects and shapes that represent components within the visual presentation of the data. The display list is then processed by a rendering engine, which may be located on an embedded device. The rendering engine processes the components contained within the display list to render an image of the source application's output that may be presented on the display of the device. As will be described below, the adaptable front end determines the file structure of the source being processed, thereby providing a device that may operate with a plurality of different file types, and source applications.

Additionally, and optionally, the rendering engines described herein will provide for progressive rendering of images on the display of the device. This provides a visual display interface that will render images more quickly by having the finer features within the presentation appear subsequent to the more easily rendered features within the presentation. Additionally, as the system described herein may break a document down into component objects, each of the objects may be processed separately including processing objects with special effects, such as shading, coloring, and transparency, thereby providing a layered look to images presented by the system described herein.

In a first aspect, the invention relates to a digital document processing system comprising a mechanism for receiving an input bytestream representing source data in one of a plurality of predetermined data formats; an interpreting mechanism for interpreting the bytestream.

A converting device for converting interpreted content from the bytestream into an internal representation data format, and a device for processing the internal representation data so as to generate output representation data adapted to drive an output device.

In a second aspect, the invention relates to a graphical user interface for a data processing system in which interactive visual displays employed by the user interface are generated by means of a digital document processing system in accordance with the first aspect of the invention and to data processing systems incorporating such a graphical user interface.

In further aspects, the invention relates to various types of device incorporating a digital document processing system in accordance with the first aspect of the invention, including hardware devices, data processing systems and peripheral devices.

In still another aspect, the invention relates to a graphical user interface for a data processing system, having one or more of a number of novel and/or enhanced features, and to data processing systems incorporating such a graphical user interface.

Embodiments of the invention will now be described, by way of example only, with reference to the accompanying drawing.

BRIEF DESCRIPTION OF THE DRAWING

The foregoing and other objects and advantages of the invention will be appreciated more fully from the following further description thereof, with reference to the accompanying drawings wherein.

DETAILED DESCRIPTION OF THE PREFERRED EMBODIMENTS

The systems and methods described herein will now be described with reference to certain illustrative applications and embodiments, including embodiments that are well suited for identifying a file type associated with a source application's output, such as a document produced by a word processing application, to generate a representation of the visual display of that output, wherein the representation is presented in an abstract form that may be rendered by a rendering engine adapted for a particular platform, such as a hand-held device. However, the systems and methods described herein may be employed in other applications and the embodiments depicted herein are merely illustrative of certain embodiments of the invention, and are not to be understood as limiting in any way.

Figure 1:
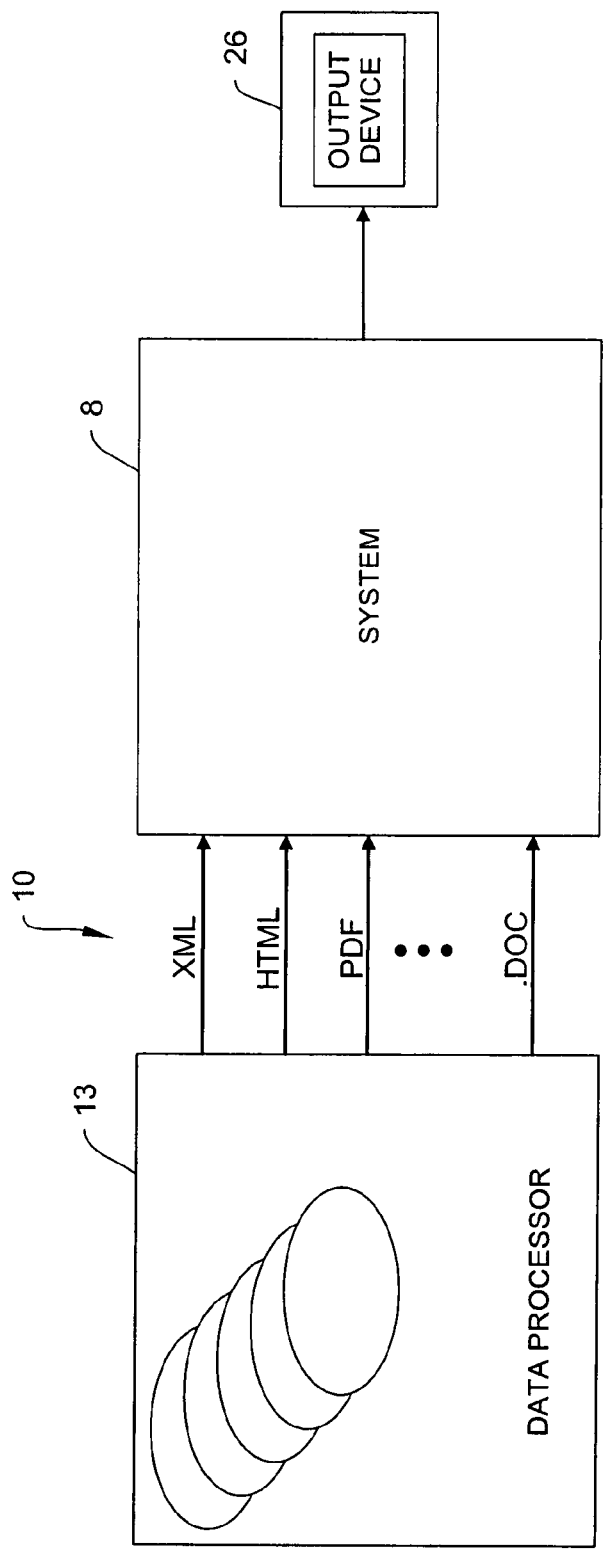
FIG. 1 is a functional block diagram illustrating an embodiment of a digital document processing system in accordance with the present invention.

Turning now to FIG. 1, one system 8 according to the invention is depicted. Specifically, FIG. 1 depicts the system 8, a data processor 13 having a plurality of executing processes, a plurality of output source streams 10 and an output display 26. The data processor 13 can be any suitable data processing platform including a conventional data processing platform, such as a pc workstation or a server. The processes executing on the data processor may be any application that produces an output source that is to be, or may be, rendered on a display. For example, the depicted processes may include word processing programs that generate .doc files, which may be presented a pages on a visual display. Similarly, the processes 13 may include a web server that delivers HTML, XML, streaming multi-media, or PDF files for display by a browser. The depicted output target device 26 may be any suitable device that can act as a display for the source being delivered by the processes 13.

Accordingly, FIG. 1 depicts that the system 8 of the invention can couple to the output sources of a plurality of different applications, as well as output sources that differ in format. The system 8 can identify the format of each source and process the source as a function of its format. The processed source can be presented in a format suitable for presentation on the display of the target device 26.

Figure 2:
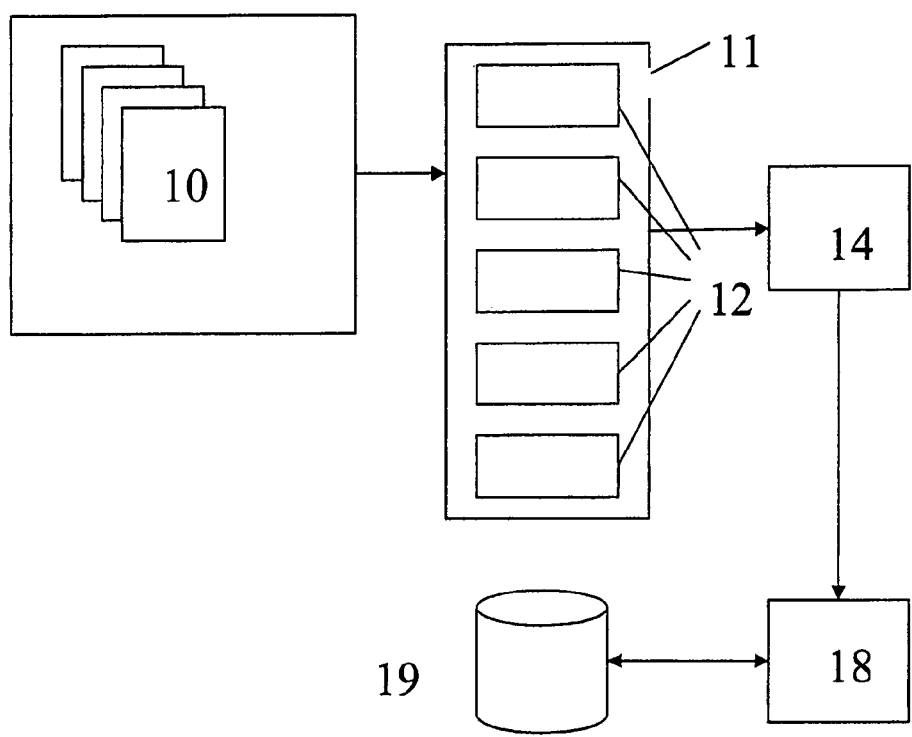
FIG. 2 is a functional block diagram that shows the system of the invention in greater detail.

FIG. 2 depicts in more detail the system 8 of FIG. 1. Specifically, FIG. 2 depicts a plurality of application sources 10, the system 8 that includes an input module 11, or front end, a plurality of document agent processes 12, a display list 14 representative of an internal representation of the visual image that is associated with the application source 10 being processed, a rendering module 18 and a library of generic objects 19.

The adaptive front end 11 includes a plurality of document agents 12. Each document agent 12 can be a software or hardware module that is capable of receiving a stream, such as a Unix stream or Java stream, that is associated with an application source 10. The document agent 12 can sort through the stream to determine whether the agent 12 recognizes the format of that stream. If the format is recognized as belonging to that agent 12, the agent 12 can begin processing fully the input stream. The processing of an output source can include parsing the source to identify tokens within the source representative of the image that is to be displayed. These tokens can include text, fonts, bit-maps and other such identifiers.

In the depicted embodiment, the front end 11 includes a plurality of different document agents, each being associated with a different format output source. By providing a plurality of document agents 12 and by allowing each document agent 12 to examine the output source that is to be processed, the system of FIG. 2 is a pluripotent processing engine that can display the output source of multiple files.

As the document agent 12 processes the output stream, the agent 12 builds a new data file, the display list 14, that encodes the visual image presented by the output source. The display list 14 comprises an internal representation of the visual image. The display list 14 can be passed to the rendering engine 18, which will process the information within the display list to create the visual image on the target output device 26. To this end, the document agent 12 builds the internal representation 14 of the visual image, by creating a file that includes a set of pointers to a library of known objects. When the rendering engine 18 operates, the library 19 of know objects is referenced and the objects retrieved from the library 19 for display on the target display device.

Although FIGS. 1 and 2 graphically depict the system 8 as comprising functional block elements, it will be apparent to one of ordinary skill in the art that these elements can be realized as computer programs or portions of computer programs that are capable of running on a data processor platform, such as the target device 26, to thereby configure the data processor as a system according to the invention. These programs can be realized as software components operating on a conventional data processing system such as a Unix workstation, and can be implemented as a C language computer program, or a computer program written in any high level language including C++, Fortran, Java or basic. Additionally, in an embodiment where microcontrollers or DSPs are employed, the systems described herein can be realized as a computer program written in microcode or written in a high level language and compiled down to microcode that can be executed on the platform employed.

Figure 3:
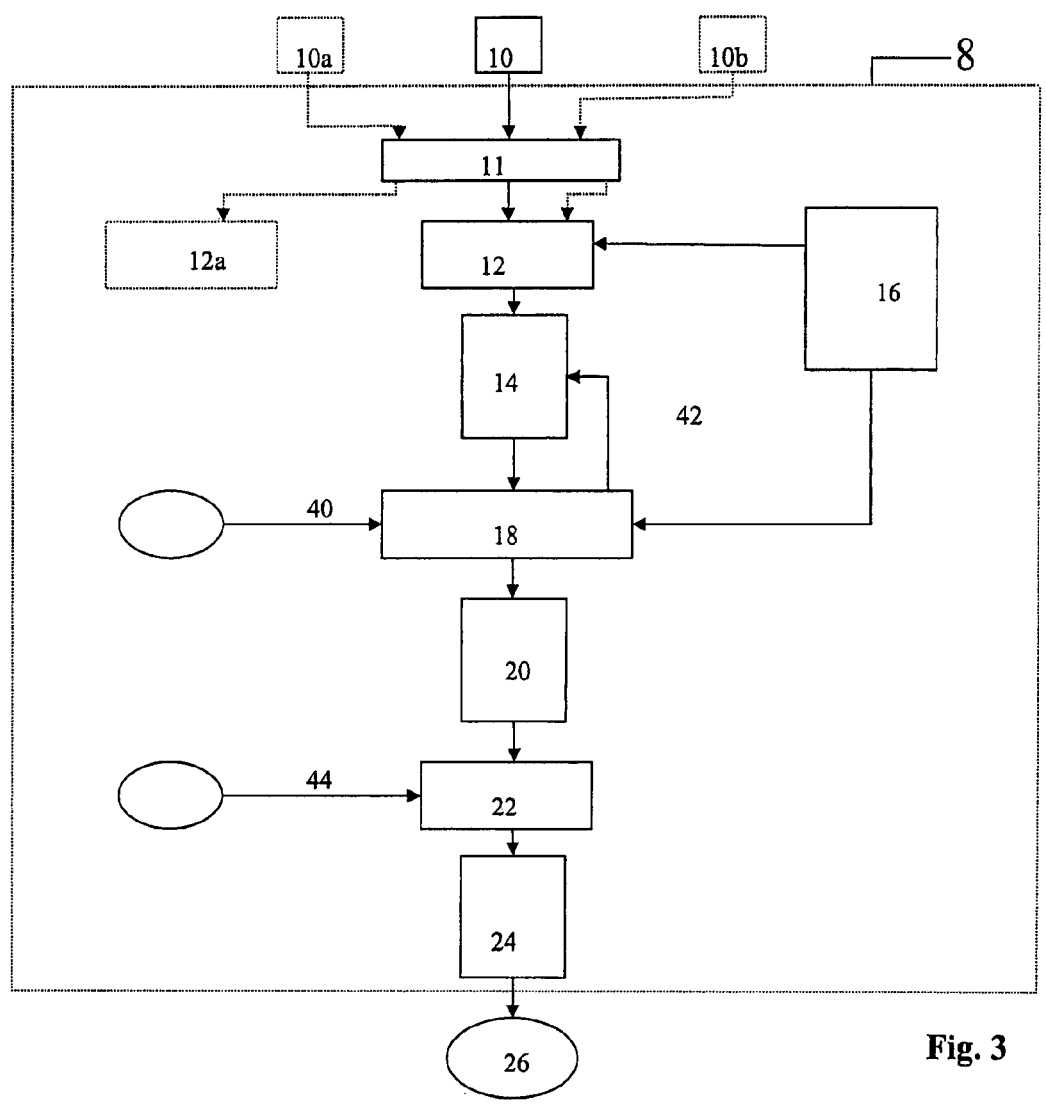
FIG. 3 is a data flow diagram depicting the operational flow of data through a system such as the system depicted in FIG. 3.

Referring now to the drawings, a digital document processing system 8 embodying the invention is illustrated in FIG. 3.

In general terms, the system 8 will process a source document 10 comprising a data file in a known format. The input to the system 8 is a bytestream comprising the content of the source document. An input module 11 identifies the file format of the source document on the basis of any one of a variety of criteria, such as an explicit file-type identification within the document, from the file name (particularly the file name extension), or from known characteristics of the content of particular file types. The bytestream is input to a "document agent" 12, specific to the file format of the source document. The document agent 12 is adapted to interpret the incoming bytestream and to convert it into a standard format employed by the system 8, resulting in an internal representation 14 of the source data in a "native" format suitable for processing by the system 8. The system 8 will generally include a plurality of different document agents 12, each adapted to process one of a corresponding plurality of predetermined file formats.

The system 8 may also be applied to input received from an input device such as a digital camera or scanner. In this case the input bytestream may originate directly from the input device, rather from a "source document" as such. However, the input bytestream will still be in a predictable data format suitable for processing by the system and, for the purposes of the invention, input received from such an input device may be regarded as a "source document."

The document agent 12 employs a library 16 of standard objects to generate the internal representation 14, which describes the content of the source document in terms of a collection of generic objects as defined in the library 16, together with parameters defining the properties of specific instances of the various generic objects within the document. It will be understood that the internal representation may be saved/stored in a file format native to the system and that the range of possible source documents 10 input to the system 8 may include documents in the system's native file format. It is also possible for the internal representation 14 to be converted into any of a range of other file formats if required, using suitable conversion agents (not shown).

The generic objects employed in the internal representation 14 will typically include: text, bitmap graphics and vector graphics (which may or may not be animated and which may be two- or three-dimensional: video, audio and a variety of types of interactive objects such as buttons and icons. The parameters defining specific instances of generic objects will generally include dimensional co-ordinates defining the physical shape, size and location of the object and any relevant temporal data for defining objects whose properties vary with time (allowing the system to deal with dynamic document structures and/or display functions). For text objects, the parameters will normally also include a font and size to be applied to a character string. Object parameters may also define other properties, such as transparency.

The format of the internal representation 14 separates the "structure" (or "layout") of the documents, as described by the object types and their parameters, from the "content" of the various objects; e.g. the character string (content) of a text object is separated from the font, character size and dimensional parameters of the object; the image data (content) of a graphic object is separated from its dimensional parameters. This allows document structures to be defined in a very compact manner and provides the option for content data to be stored remotely and to be fetched by the system only when needed.

The internal representation 14 describes the document and its constituent objects in terms of "high-level" descriptions.

The internal representation data 14 is input to a parsing and rendering module 18 which generates a context-specific representation 20 or "view" of the document represented by the internal representation 14. The required view may be of the whole document or of part(s) (subset(s)) thereof. The parser/renderer 18 receives view control inputs 40 which define the viewing context and any related temporal parameters of the specific document view which is to be generated. For example, the system may be required to generate a zoomed view of part of a document, and then to pan or scroll the zoomed view to display adjacent portions of the document. The view control inputs 40 are interpreted by the parser/renderer 18 in order to determine which parts of the internal representation are required for a particular view and how, when and for how long the view is to be displayed.

The context-specific representation/view 20 is again expressed in terms of object types and parameters, using the library 16.

The parser/rendered 18 may also perform additional pre-processing functions on the relevant parts of the internal representation 14 when generating the required view 20 of the source document 10. The view representation 20 is input to a shape processor module 22 for final processing to generate a final output 24, in a format suitable fore driving an output device 26, such as a display device or printer.

The pre-processing functions of the parser/renderer 18 may include colour correction, resolution adjustment/enhancement and anti-aliasing. Resolution enhancement may comprise scaling functions which preserve the legibility of the content of objects when displayed or reproduced by the target output device. Resolution adjustment may be context-sensitive; e.g. the display resolution of particular objects may be reduced while the displayed document view is being panned or scrolled and increased when the document view is static.

There may be a feedback path 42 between the renderer/parser 18 and the internal representation 14, e.g. for the purpose of triggering an update of the content of the internal representation 14, such as in the case where the document 10 represented by the internal representation comprises a multi-frame animation.

The output representation 20 from the parser/renderer 18 expresses the document in terms of "primitive" objects. For each document object, the representation 20 preferably defines the object at least in terms of a physical, rectangle boundary box, the actual shape of the object bounded by the boundary box, the data content of the object, and its transparency.

The shape processor 22 interprets the representation 20 and converts it into an output frame format 24 appropriate to the target output device 26; e.g. a dot-map for a printer, vector instruction set for a plotter, or bitmap for a display device. An output control input 44 to the shape processor 22 to generate output 24 suitable for a particular output device 26.

The shape processor 22 preferably processes the objects defined by the view representation 20 in terms of "shape" (i.e. the outline shape of the object), "fill" (the data content of the object) and "alpha" (the transparency of the object), performs scaling and clipping appropriate to the required view and output device, and expresses the object I terms appropriate to the output device (typically in terms of pixels by scan conversion or the like, for most types of display device or printer).

The shape processor 22 preferably includes an edge buffer which defines the shape of an object in terms of scan-converted pixels, and preferably applies anti-aliasing to the outline shape. Anti-aliasing is preferably performed in a manner determined by the characteristics of the output device 26 (i.e. on the basis of the control input 44), by applying a grey-scale ramp across the object boundary. This approach enables memory efficient shape-clipping and shape-intersection processes.

A look-up table may be employed to define multiple tone response curves, allowing non-linear rendering control (gamma correction).

The individual object processed by the shape processor 22 are combined in the composite output frame 24. The quality of the final output can also be controlled by the user via the output control input 44.

The shape processor 22 has a multi-stage pipeline architecture which lends itself to parallel processing of multiple objects, or of multiple documents, or of multiple subsets of one or more document, by using multiple instances of the shape processor pipeline. The pipeline architecture is also easily modified to include additional processing functions (e.g. filter functions) if required. Outputs from multiple shape processors 22 may generate multiple output frames 24 or may be combined in a single output frame 24.

The system architecture is modular in nature. This enables, for example, further document agents to be added as and when required, to deal with additional source file formats. The modular architecture also allows individual modules such as the library 16, parser/renderer 18 or shape processor 22 to be modified or upgraded without requiring changes to other modules.

The system architecture as a whole also lends itself to parallelism in whole or in part for simultaneous processing of multiple input documents 10a, 10b, etc. or subsets of documents, in one or more file formats, via one or more document agents 12, 12a. The integrated, modular nature of the system allows multiple instances of system modules to be spawned within a data processing system or device as and when required, limited only by available processing and memory resources.

The potential for flexible parallelism provided by the system as a whole and the shape processor 22 in particular allows the display path for a given device to be optimized for available bandwidth and memory. Display updates and animations may be improved, being quicker and requiring less memory. The object/parameter document model employed is deterministic and consistent. The system is fully scalable and allows multiple instances of the system across multiple CPUs.

The system preferably employs a device-independent clour model, suitable a luminance/chrominance model such as the CIE L*A*B* 1976 model. This reduces redundancy in graphic objects, improves data compressibility and improves consistency of colour output between different output devices. Device-dependent colour correction can be applied on the basis of the device-dependent control input 44 to the shape processor 22.

FIG. 2 shows the system having an input end at which the source bytestream is received and an output end where the final output frame 24 is output from the system. However, it will be understood that the system may include intermediate inputs and outputs at other intermediate stages, such as for fetching data content or for saving/converting data generated in the course of the process.

The system 8 may be incorporated into a variety of types of data processing systems and devices, and into peripheral devices, in a number of different ways. In a general purpose data processing system (the "host system"), the system of the present invention may be incorporated alongside the operating system and applications of the host system or may be incorporated fully or partially into the host operating system.

For example, the system of the present invention enables rapid display of a variety of types of data files on portable data processing devices with LCD displays without requiring the use of browsers or application programs. This class of data processing devices requires small size, low power processors for portability. Typically, this requires the use of advanced RISC-type core processors designed in to ASICs (application specific integrated circuits), in order that the electronics package is as small and highly integrated as possible. This type of device also has limited random access memory and typically has no non-volatile data store (e.g. hard disk). Conventional operating system models, such as are employed in standard desktop computing systems (PCs), require high powered central processors and large amounts of memory in order to process digital documents and generate useful output, and are entirely unsuited for this type of data processing device. In particular, conventional systems do not provide for the processing of multiple file formats in an integrated manner. By contrast, the present invention utilizes common processes and pipelines for all file formats, thereby providing a highly integrated document processing system which is extremely efficient in terms of power consumption and usage of system resources.

The system of the present invention may be integrated at the BIOS level of portable data processing devices to enable document processing and output with much lower overhead than conventional system models. Alternatively, the invention may be implemented at the lowest system level just above the transport protocol stack. For example, the system may be incorporated into a network device (card) or system, to provide in-line processing of network traffic (e.g. working at the packet level in a TCP/IP system).

In a particular device, the system of the invention is configured to operate with a predetermined set of data file formats and particular output devices; e.g. the visual display unit of the device and/or at least one type of printer.

Examples of portable data processing devices which may employ the present system include "palmtop" computers, portable digital assistants (PDAs, including tablet-type PDAs in which the primary user interface comprises a graphical display with which the user interacts directly by means of a stylus device), internet-enabled mobile telephones and other communications devices, etc.

The system may also be incorporated into low cost data processing terminals such as enhanced telephones and "thin" network client terminals (e.g. network terminals with limited local processing and storage resources), and "set-top boxes" for use in interactive/internet-enabled cable TV systems.

When integrated with the operating system of a data processing system, the system of the present invention may also form the basis of a novel graphical user interface *GUI) for the operating system (OS). Documents processed and displayed by the system may include interactive features such as menus, buttons, icons etc. which provide the user interface to the underlying functions of the operating system. By extension, a complete OS/GUI may be expressed, processed and displayed in terms of system "documents"> The OS/GUI could comprise a single document with multiple "chapters".

GUI features of this type provide new or enhanced functionality and/or improve the subjective quality of the user interface.

The system of the present invention may also be incorporated into peripheral devices such as hardcopy devices (printers and plotters), display devices (such as digital projectors), networking devices, input devices (cameras, scanners, etc.) and also multi-function peripherals (MPPs).

When incorporated into a printer, the system enables the printer to receive raw data files from the host data processing system and to reproduce the content of the original data file correctly, without the need for particular applications or drivers provided by the host system. This avoids the need to configure a computer system to drive a particular type of printer. The present system directly generates a dot-mapped image of the source document suitable for output by the printer (this is true whether the system is incorporated into the printer itself or into the host system). Similar considerations apply to other hardcopy devices such as plotters.

When incorporated into a display device, such as a projector, the system again enables the device to display the content of the original data file correctly without the use of applications or drivers on the host system, and without the need for specific configuration of the host system and/or display device. Peripheral devices of these types, when equipped with the present system, may receive and output data files from any source, via any type of data communications network.

From the foregoing, it will be understood that the system of the present invention may be "hard-wired"; e.g. implemented in ROM and/or integrated into ASICs or other single-chip systems, or may be implemented as firmware (programmable ROM such as flashable ePROM), or as software, being stored locally or remotely and being fetched and executed as required by a particular device.

Improvements and modifications may be incorporated without departing from the scope of the present invention and those skilled in the art will know or be able to ascertain using no more than routine experimentation, many equivalents to the embodiments and practices described herein. For example, the systems may be employed for the use of thumbnail images of documents for navigation purposes and for recording user activities (history); e.g. when browsing network content. Additionally, the systems can allow for document interaction functions and gesture-based commands using pointing devices and/or touch-screen technology. This may include allowing document interaction by means of gestures analogous to actions used with physical documents or books, such as dragging a pointer across a page in order to turn the page ("page-flipping"), dragging a pointer to curl back the corner of a page to view underlying parts of succeeding pages ("page curl"); Allowing tool selection by dragging tools from toolbars and de-selection by dragging tools to predetermined parts of the display; Symbolic cursor movements to indicate particular OS commands, such as "tick", "cross-out" and "circle" movements for "OK", "delete" and "select"; editing commands based on conventional "proof-readers" notation. Further applications for the systems and methods described herein include re-formatting document views by rotation or switching between landscape and portrait formats.

Additionally, the systems and methods described herein provide for utilities and tools such as, floating virtual "magnifying glass" which magnifies the underlying document area, in which the magnified view is based on the internal representation 14 of the source document rather than on a bitmap representation of the document and which may modify document parameters such as background and/or foreground colours; a floating virtual, translucent keyboard for text input using a pointing device/touch screen; a floating, virtual, translucent ruler which is re-scalable using any of a variety of user-selectable units. The systems also provide for alternative menu or "tabbed page" drag out/pull down functions and simulation of physical inertia/momentum applied to page scrolling/panning functions (e.g. when a zoomed display of a page is dragged to scroll the display and released, the moving display decelerates gradually after release).

Accordingly, it will be understood that the invention is not to be limited to the embodiments disclosed herein, but is to be understood from the following claims, which are to be interpreted as broadly as allowed under the law.

The invention claimed is:

1. A computing device comprising:
    an operating system comprising machine executable code stored on a machine readable medium being executed by a processor;
    a graphical user interface for said operating system comprising a plurality of system documents, the system documents including an interactive feature that interacts with an underlying function of the operation system; and
    a digital document processing system integrated with the operation system including;
        a receiving module for receiving:
            i) a first input bytestream in any of a plurality of predetermined data formats representing source data of a particular data format defining the content and structure of at least one of the plurality of system documents; and
            ii) a second input bytestream representing source data defining the content and structure of a source document of the particular data format output by at least one of a plurality of applications wherein the receiving module receives the input bytestreams representing source data without use of any one application of the plurality of applications for processing the input bytestream;
        an interpreting module comprising a plurality of document agents, each one of said plurality of document agents for examining the input bytestreams of the source document to be processed and for converting by one respective document agent the input bytestreams into an internal representation of the structure and content of the respective documents in a file format native to the device, wherein the structure, as described by object types and their parameters, are separated from the content of the objects; and
        a rendering module for processing the internal representation data to generate output representation data adapted to enable a display device in communication therewith to render the output representation data to generate an interactive visual display without requiring the display device to utilize a browser, a specific configuration or driver associated with one of the plurality of applications used for outputting the source document, and
        wherein the interactive visual display including the interactive feature of the system document that interacts with the underlying function of the operating system.

2. The computing device of claim 1, wherein the digital document processing system is integrated into the operating system at the BIOS level.

3. The computing device of claim 1, wherein the digital document processing system is integrated into the operating system immediately above the transport protocol stack.

4. The computing device of claim 1, wherein the digital document processing system is integrated into the operating system through a network device.

5. The computing device of claim 1, wherein the computing device further comprises a user input module for receiving user instruction to activate the interactive feature.

6. The computing device of claim 1, wherein the rendering module processes the internal representation of the at least one system document and the source document to render a composite image that includes at least a portion of the content of the system document and at least a portion of the content of the source document.

* * * * *